US010056596B2

(12) United States Patent
Zhao

(10) Patent No.: US 10,056,596 B2
(45) Date of Patent: Aug. 21, 2018

(54) BATTERY CONNECTOR ASSEMBLY

(71) Applicant: Tyco Electronics Corporation, Berwyn, PA (US)

(72) Inventor: Weiping Zhao, Superior Township, MI (US)

(73) Assignee: TE CONNECTIVITY CORPORATION, Berwyn, PA (US)

( * ) Notice: Subject to any disclaimer, the term of this patent is extended or adjusted under 35 U.S.C. 154(b) by 702 days.

(21) Appl. No.: 14/296,231

(22) Filed: Jun. 4, 2014

(65) Prior Publication Data

US 2014/0363711 A1    Dec. 11, 2014

Related U.S. Application Data

(60) Provisional application No. 61/831,930, filed on Jun. 6, 2013.

(51) Int. Cl.
| | |
|---|---|
| *H01M 2/02* | (2006.01) |
| *H01M 2/10* | (2006.01) |
| *H01M 2/20* | (2006.01) |
| *H01M 10/48* | (2006.01) |

(52) U.S. Cl.
CPC ......... *H01M 2/206* (2013.01); *H01M 2/0245* (2013.01); *H01M 2/1077* (2013.01); *H01M 2/202* (2013.01); *H01M 10/486* (2013.01); *H01M 2/0217* (2013.01); *H01M 2220/20* (2013.01)

(58) Field of Classification Search
CPC .... H01M 10/486; H01M 2/206; H01M 2/202; H01M 2/0245; H01M 2/1077

USPC .................................................... 429/90, 121
See application file for complete search history.

(56) References Cited

U.S. PATENT DOCUMENTS

| | | | |
|---|---|---|---|
| 3,763,416 A * | 10/1973 | Jache ................. | H01M 2/1083 180/68.5 |
| 6,261,719 B1 | 7/2001 | Ikeda et al. | |
| 2004/0043663 A1 | 3/2004 | Ikeda et al. | |
| 2011/0064986 A1 | 3/2011 | Ogasawara et al. | |
| 2011/0064987 A1 * | 3/2011 | Ogasawara .......... | H01M 2/206 429/121 |

(Continued)

FOREIGN PATENT DOCUMENTS

| | | |
|---|---|---|
| CN | 102024929 A | 4/2011 |
| CN | 104321905 A | 1/2015 |

(Continued)

OTHER PUBLICATIONS

International Search Report, International Application No. PCT/2014/040986, International Filing Date, Jun. 5, 2014.

*Primary Examiner* — Sean P Cullen

(57) ABSTRACT

A battery connector system for connecting battery cells of a battery module includes a carrier assembly having a carrier housing and a plurality of bus bar assemblies held by the carrier housing. The bus bar assemblies are configured to connect corresponding battery terminals of adjacent battery cells. The carrier assembly includes a plurality of cell connecting sections each holding a corresponding bus bar assembly and cover portions associated with the cell connecting sections. The carrier housing has a unitary construction with each of the cell connecting sections and cover portions being integral.

20 Claims, 8 Drawing Sheets

(56) References Cited

U.S. PATENT DOCUMENTS

| | | | |
|---|---|---|---|
| 2011/0097620 A1* | 4/2011 | Kim | H01M 2/1061 |
| | | | 429/161 |
| 2011/0229745 A1 | 9/2011 | Barter et al. | |
| 2013/0010449 A1* | 1/2013 | Ikeda | H02G 3/0437 |
| | | | 361/826 |
| 2013/0164595 A1* | 6/2013 | Takase | H01M 2/206 |
| | | | 429/120 |
| 2013/0280959 A1* | 10/2013 | Takase | H01M 2/1077 |
| | | | 439/627 |
| 2013/0309537 A1 | 11/2013 | Zhao | |
| 2014/0017533 A1* | 1/2014 | Nishihara | H01M 2/06 |
| | | | 429/93 |
| 2015/0214534 A1* | 7/2015 | Callicoat | B23K 1/0016 |
| | | | 429/121 |

FOREIGN PATENT DOCUMENTS

| | | | | |
|---|---|---|---|---|
| EP | 2 565 957 A1 | 3/2013 | | |
| JP | 2000149909 A | 5/2000 | | |
| JP | 2010205509 A | 9/2010 | | |
| JP | 2011060675 A | 3/2011 | | |
| JP | WO 2012046517 A1 * | 4/2012 | ............ | H01M 2/206 |
| JP | WO 2012127962 A1 * | 9/2012 | ......... | H01M 2/1077 |
| JP | WO 2012131809 A1 * | 10/2012 | ............. | H01M 2/06 |
| JP | 2013017332 A | 1/2013 | | |
| WO | 2011/037268 A2 | 3/2011 | | |
| WO | 2012127962 A1 | 9/2012 | | |
| WO | 2012/176935 A1 | 12/2012 | | |

\* cited by examiner

BATTERY CONNECTOR ASSEMBLY

CROSS REFERENCE TO RELATED APPLICATIONS

This application claims the benefit of U.S. Provisional Application No. 61/831,930 filed Jun. 6, 2013, the subject matter of which is herein incorporated by reference in its entirety.

BACKGROUND OF THE INVENTION

The subject matter herein relates generally to battery modules.

Battery modules, such as those for electric vehicles or hybrid vehicles, typically includes a plurality of cells grouped together to form the battery modules. The battery modules are connected together to form battery packs. Each of the cells includes positive and negative cell terminals that are electrically connected together. Different types of battery modules are formed using different types of cells. For example, one type of battery modules are known as pouch type battery modules, another type of battery modules are known as prismatic battery modules, and a third type of battery modules are known as cylindrical battery modules.

Prismatic battery modules use prismatic battery cells that are stacked together. The positive and negative cell terminals are connected using buss bars. The positive and negative cell terminals typically include a threaded post or bolt. The buss bar is connected to the post using a nut. Such connections are time consuming, and may have other problems such as over or under torque, or cross threading. In other configurations, such as co-pending application Ser. Nos. 13/839,931 and 13/839,567 incorporated herein, avoid the problems with the threaded post or bolt wherein the positive and negative terminals are plate shaped and are connected by welding the terminals to the buss bars. In a typical welded configuration, the series of bus bars are contained in a plastic carrier. The conventional carrier has multiple pieces including a plastic carrier tray and a cover. These conventional carriers have several problems including, alignment difficulty attaching a sensing wire and difficulty attaching a thermistor.

A need remains for battery modules that use low cost, flexible carrier that accommodates sensing wires and a thermistor.

BRIEF DESCRIPTION OF THE INVENTION

In one embodiment, a battery connector system is provided for connecting battery cells of a battery module. The battery connector system includes a carrier assembly having a carrier housing and a plurality of bus bar assemblies held by the carrier housing. The bus bar assemblies are configured to connect corresponding battery terminals of adjacent battery cells. The carrier assembly includes a plurality of cell connecting sections each holding a corresponding bus bar assembly and covers associated with the cell connecting sections. The carrier housing has a unitary construction with each of the cell connecting sections and covers being integral.

In another embodiment, a battery connector system for connecting battery cells of a battery module is provided that includes a carrier assembly having a carrier housing and a plurality of bus bar assemblies held by the carrier housing. The bus bar assemblies are configured to connect corresponding battery terminals of adjacent battery cells. The carrier assembly includes a plurality of cell connecting sections each holding a corresponding bus bar assembly. The cell connecting sections are connected by flexible hinges that allow relative movement between adjacent cell connecting sections. The carrier housing has a unitary construction with each of the cell connecting sections and hinges being integral.

In a further embodiment, a battery connector system for connecting battery cells of a battery module is provided that includes a plurality of bus bar assemblies and a plurality of sensing wire assemblies. Each bus bar assembly has a bus bar configured to connect corresponding battery terminals of adjacent battery cells. Each sensing wire assembly is connected to a corresponding bus bar assembly. Each sensing wire assembly has a sensing wire mechanically and electrically connected to the corresponding bus bar. A carrier assembly has a carrier housing holding the bus bar assemblies and wire sensing assemblies. The carrier housing includes a plurality of cell connecting sections. Each cell connecting section has a bus bar cavity portion holding a corresponding bus bar and a wire trace cavity portion holding a plurality of the wires of the sensing wire assemblies. The carrier housing has a unitary construction with each of the cell connecting sections being integral.

DETAILED DESCRIPTION OF THE INVENTION

Figure 1:
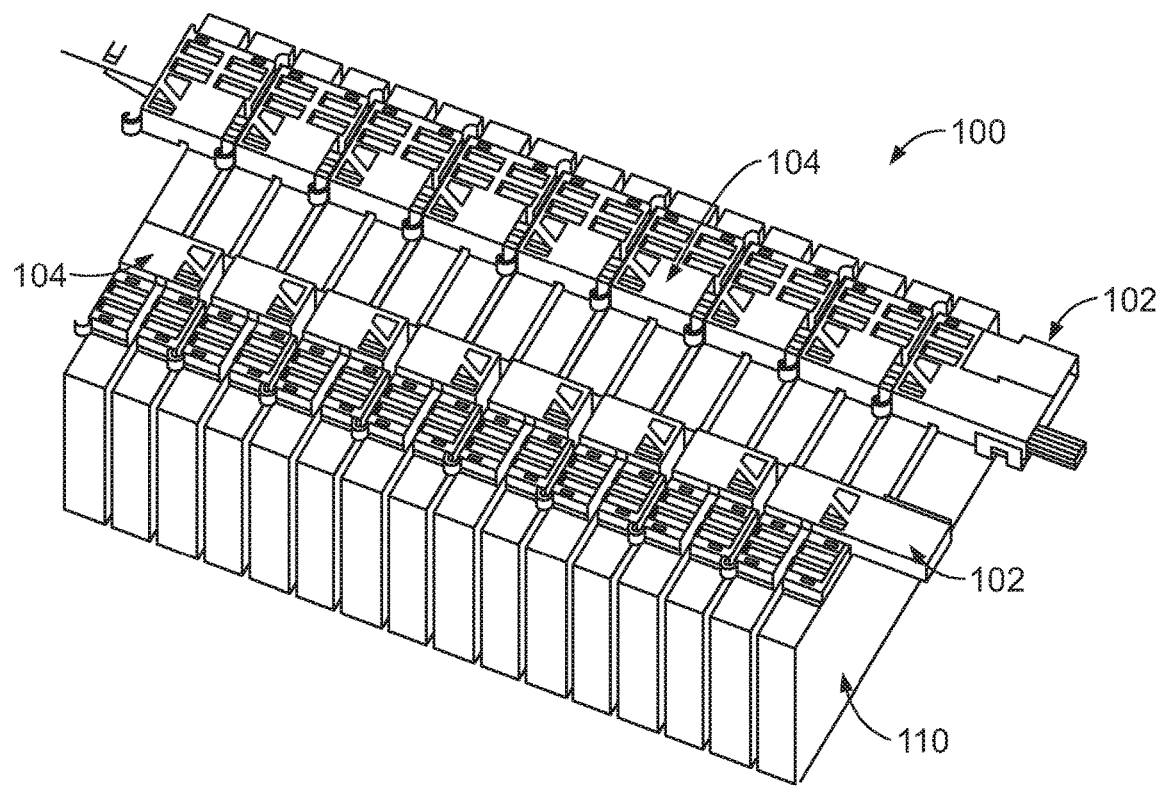
FIG. 1 is a top perspective view of a battery connector system having a carrier assembly formed in accordance with an exemplary embodiment.

FIG. 1 is a top perspective view of a battery connector system 100 formed in accordance with an exemplary embodiment. The battery connector system 100 includes a battery module 110 and a carrier assembly 102. As will be further described below, the carrier assembly 102 comprises one or more carrier housings 104 holding a plurality of bus bar assemblies 106 (see FIGS. 3 and 4) and a plurality of sensing wire assemblies 108 associated with corresponding bus bar assemblies 106.

Figure 2:
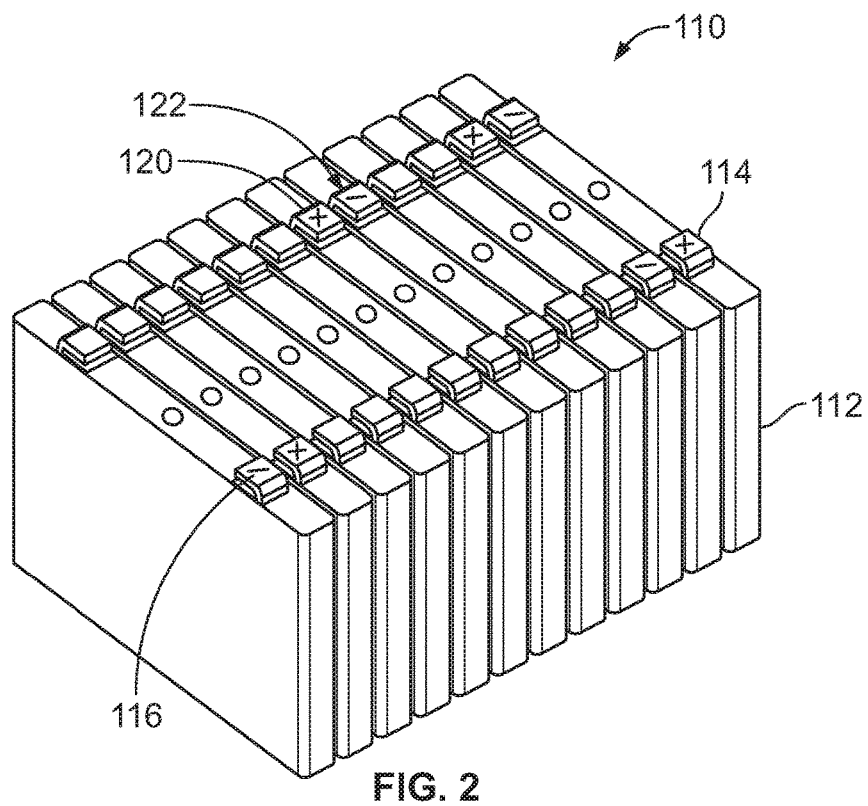
FIG. 2 is a top perspective view of a battery module of the battery connector system.

FIG. 2 is a top perspective view of the battery module 110 with the carrier assembly 102 (shown in FIG. 1) removed to illustrate battery cells 112 of the battery module 110. The battery module 110 may be used as part of a battery system in a vehicle, such as an electric vehicle or a hybrid electrical vehicle. The battery module 110 may be used in other applications in alternative embodiments. Multiple battery modules 110 may be ganged together to form a battery pack assembly.

Each battery module 110 includes a plurality of prismatic battery cells 112. The prismatic battery cells 112 are arranged in a stacked configuration, side-by-side, to form the battery module 110. Optional, the battery module 110 may include a case or other housing that holds the prismatic battery cells 112. A battery cover (not shown) may be provided over the tops of the prismatic battery cells 112 and the carrier assembly 102. The battery cover may cover each of the prismatic battery cells 112.

Each battery module 110 includes a positive battery terminal 114 and a negative battery terminal 116. The terminals 114, 116 are configured to be coupled to an external power cable or alternatively may be bussed to battery cell terminals of another battery module 110, such as using a module-to-module connector. Each battery cell 112 includes a positive battery cell terminal 120 and a negative battery cell terminal 122. In an exemplary embodiment, the positive cell terminal 120 is connected to an adjacent negative battery cell terminal 122 of an adjacent battery cell 112 by the corresponding bus bar assembly 106 (shown in FIGS. 3 and 4). Likewise, the negative cell terminal 122 is connected to an adjacent positive battery cell terminal 120 of an adjacent battery cell 112 by the corresponding bus bar assembly 106. The cell terminals 120, 122 of the end battery cells 112 may define the battery terminals 114, 116.

Figure 3:
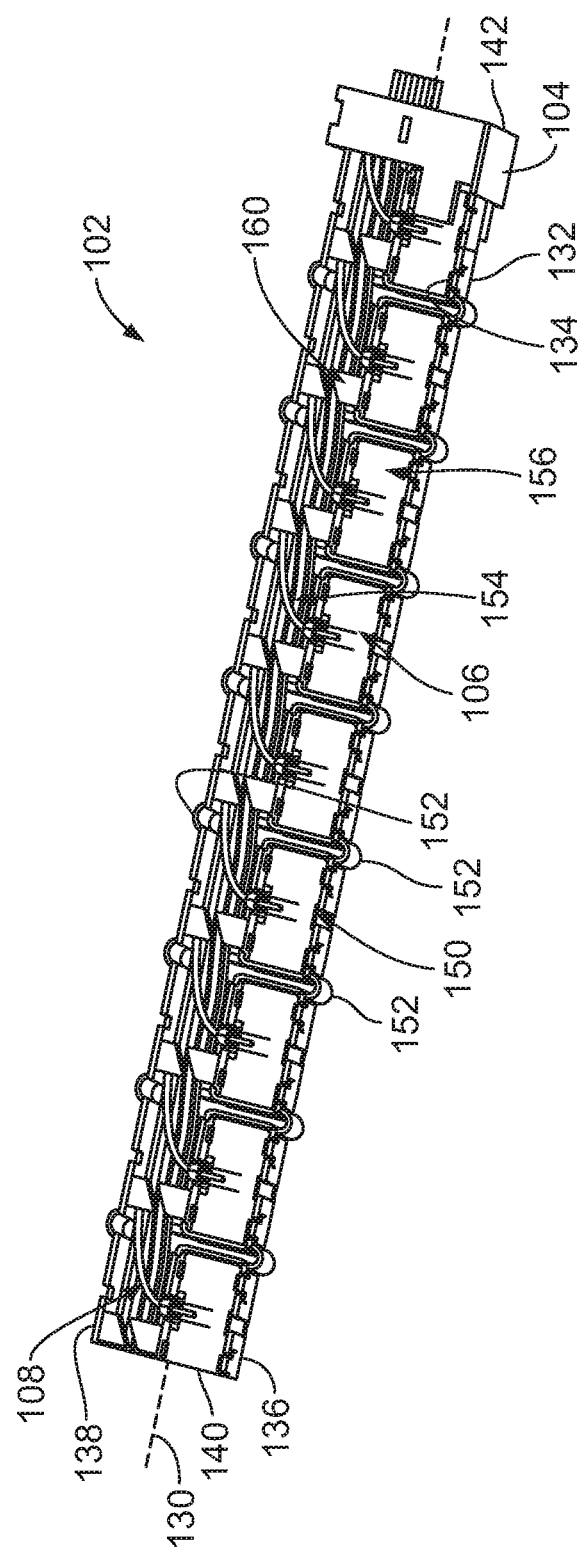
FIG. 3 is a bottom perspective view of a portion of the carrier assembly formed in accordance with an exemplary embodiment.

FIG. 3 is a bottom perspective view of a portion of the carrier assembly 102 in accordance with an exemplary embodiment. In an exemplary embodiment, the carrier assembly 102 includes two carrier housings 104 (only one shown in FIG. 3) for installation over the two rows of battery cell terminals 120, 122. Optionally, the carrier housings 104 may be identical to each other. The carrier housings 104 may be separate from each other and separately mountable over the two rows of battery cell terminals 120, 122, such as at opposite sides of the battery module 110 (shown in FIG. 2). Alternatively, the carrier housings 104 may be part of a unitary, single piece structure, such as being co-molded with each other, with connecting pieces therebetween. In such embodiment, features may be provided to allow relative movement of the carrier housings 104 with respect to each other, such as to properly align the carrier housings 104 with the terminals 120, 122. For example, flexible hinges may be provided between the carrier housings 104.

The carrier housing 104 extends along a longitudinal axis 130 extending perpendicular to the battery cell axes, which extend between the cell terminals 120, 122 of the particular battery cell 112 (shown in FIG. 2). The carrier housing 104 is made from a non-conductive material, such as plastic, and is manufactured as a single unitary construction. For example, the carrier housing 104 may be single shot molded from plastic material.

The carrier housing 104 includes a top 132, a bottom 134, opposite first and second sides 136, 138 and opposite first and second ends 140, 142. The first and second sides 136, 138 extend generally parallel to the longitudinal axis 130. The carrier assembly 102 is mounted to the battery module 110 so that the bottoms 134 face, and may be mounted to, the battery cells 112. The carrier assembly 102 is mounted to the battery module 110 so that the second sides 138 face each other and such that the first sides 136 face in opposing directions. The first sides 136 thus define exterior sides and the second sides 138 thus define interior sides.

The carrier housing 104 includes a plurality of cell connecting sections 150. In an exemplary embodiment, the cell connecting sections 150 are connected together by living hinges 152, such that the cell connecting sections 150 are movable relative to each other, such as to align the cell connecting sections 150 with corresponding battery cells 112. Optionally, living hinges 152 may be provided along both the first and second sides 136, 138 between each adjacent cell connecting section 150. The living hinges 152 are flexible. The living hinges 152 may be lengthened or shortened as the cell connecting sections 150 are pushed or pulled relative to each other. The living hinges 152 may allow longitudinal and/or lateral and/or vertical movement of the cell connecting sections 150 relative to each other.

In an exemplary embodiment, each cell connecting section 150 includes a wire trace cavity portion 154 and a bus bar cavity portion 156. The wire trace cavity portion 154 extends longitudinally along at least a portion of the length of the carrier housing 104. The wire trace cavity portion 154 receives one or more corresponding sensing wire assemblies 108. The wire trace cavity portion 154 is provided at the second side 138. The bus bar cavity portions 156 receives a corresponding bus bar assembly 106. The bus bar cavity portion 156 is provided at the first side 136. The bus bar cavity portions 156 are adjacent the wire trace cavity portions 154 such that the sensing wire assemblies 108 may extend into associated bus bar cavity portions 156 for electrical termination of the sensing wire assemblies 108 to the bus bar assemblies 106 and/or such that the bus bar assemblies 106 may extend into associated wire trace cavity portions 154 for electrical termination of the sensing wire assemblies 108 to the bus bar assemblies 106.

The carrier housing 104 includes one or more thermistor assemblies 160. The thermistor assemblies 160 are coupled to the corresponding carrier housing 104. The thermistor assemblies 160 may be installed within one or more wire trace cavity portions 154.

Figure 4:
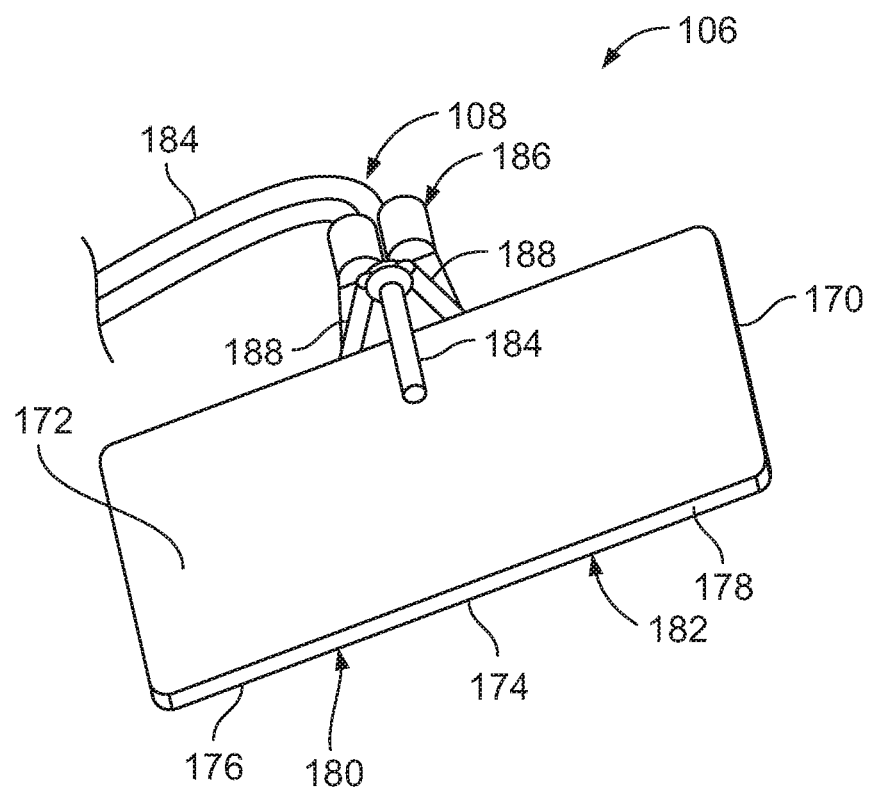
FIG. 4 is a top perspective view of a bus bar assembly of the carrier assembly having a sensing wire assembly attached thereto.

FIG. 4 is a top perspective view of the bus bar assembly 106 having the associated sensing wire assembly 108 attached thereto. The bus bar assembly 106 includes a bus bar 170 used to electrically connect cell terminals 120, 122 (shown in FIG. 2) of adjacent prismatic battery cells 112 (shown in FIG. 2). Each bus bar 170 is generally rectangular in shape or any other shapes having a top side 172, a bottom side 174, a first cell end 176 and an opposite second cell end 178. The bus bar 170 is configured to be terminated to a positive cell terminal 120 (shown in FIG. 2) at a first interface 180 and a corresponding negative cell terminal 122 (shown in FIG. 2) of the adjacent battery cell 112 at a second interface 182. In an exemplary embodiment, the bus bar 170 is terminated by welding to the terminals 120, 122, such as by laser welding, ultrasonic welding, resistance welding, and the like, and as such, the interfaces 180, 182 define weld interfaces 180, 182, respectively. The bus bar 170 may be terminated by other processes or methods in alternative embodiments.

The sensing wire assembly 108 provides sensing, such as voltage sensing, of each battery cell 112, such as to a centralized battery management system. The sensing wire assembly 108 includes a sensing wire 184. In the exemplary embodiment, the sensing wire 184 is electrically connected to the corresponding bus bar 170, such as by welding the sensing wire 184 to the bus bar 170. The sensing wire 184 may be terminated by other processes or methods in alternative embodiments, such as crimping, soldering, insulation displacement, and the like. In an exemplary embodiment, the sensing wire 184 is coupled to a sensing wire grip 186 of the bus bar assembly 106. For example, the sensing wire grip 186 may include a plurality of metal tabs 188 that are coupled to the sensing wire 184. The metal tabs 188 may be crimped around the sensing wire 184. Optionally, the sensing wire 184 may be electrically connected to the bus bar 170 by the sensing wire grip 186, such as by crimping, welding, soldering, and the like. Alternatively, the sensing wire 184 may simply be mechanically connected to the bus bar 170 by the sensing wire grip 186, such as to hold the relative positions of the sensing wire 184 and the bus bar 170 for welding the sensing wire 184 to another portion of the bus bar 170, such as the top side 172. The metal tabs 188 may pinch the insulation of the sensing wire 184 to hold the position of the sensing wire 184 relative to the bus bar 170. Optionally, the metal tabs 188 may be formed around the sensing wire 184, such as by a forming process or a crimping process. Alternatively, the metal tabs 188 may be pre-formed and then the sensing wire 184 is pressed between the metal tabs 188 and held therein by a compression fit or friction fit. The sensing wire grip 186 provides support for the sensing wire 184. Optionally, a seal may be provided for the joints between the sensing wire 184 and the bus bar 170, such as to prevent or reduce corrosion at the joint. Optionally, the sensing wire 184 and the bus bar 170 may be manufactured from the same or similar metals. Alternatively, the sensing wire 184 and bus bar 170 may be manufactured from different metals. Optionally, the bus bar 170 may be a bi-metal.

Figure 5:
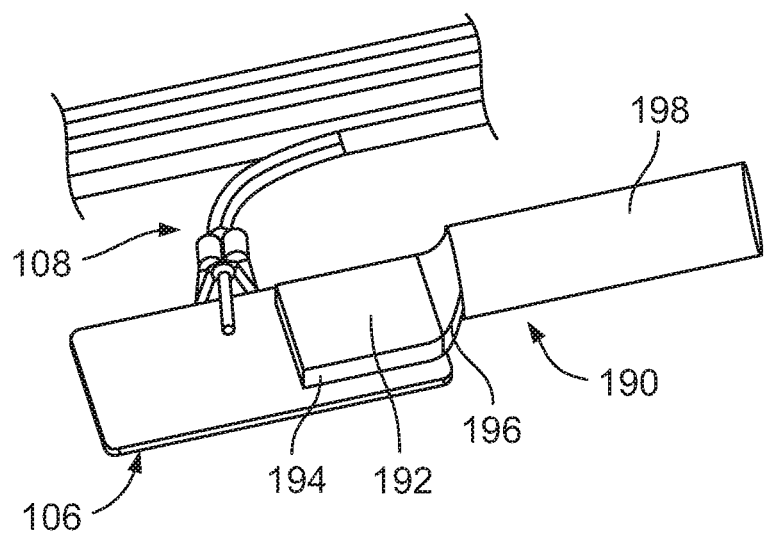
FIG. 5 is a top perspective view of the bus bar assembly having the sensing wire assembly and a power terminal assembly attached thereto.

FIG. 5 is a top perspective view of the bus bar assembly 106 having a power terminal assembly 190 attached thereto. Such bus bar assembly 106 is used at particular battery cells 112 (shown in FIG. 2), such as the battery cells 112 having the positive or negative battery terminals 114, 116 (shown in FIG. 2). The sensing wire assembly 108 is terminated to the bus bar 170.

The power terminal assembly 190 includes a power terminal 192 having a first end 194 electrically coupled (e.g. welded) to the top side 172 of the bus bar 170 and a second end 196 electrically coupled (e.g. crimped) to metal strands of a power cable 198. The battery cells 112 supply power to the power cable 198 via the bus bar 170.

Figure 6A:
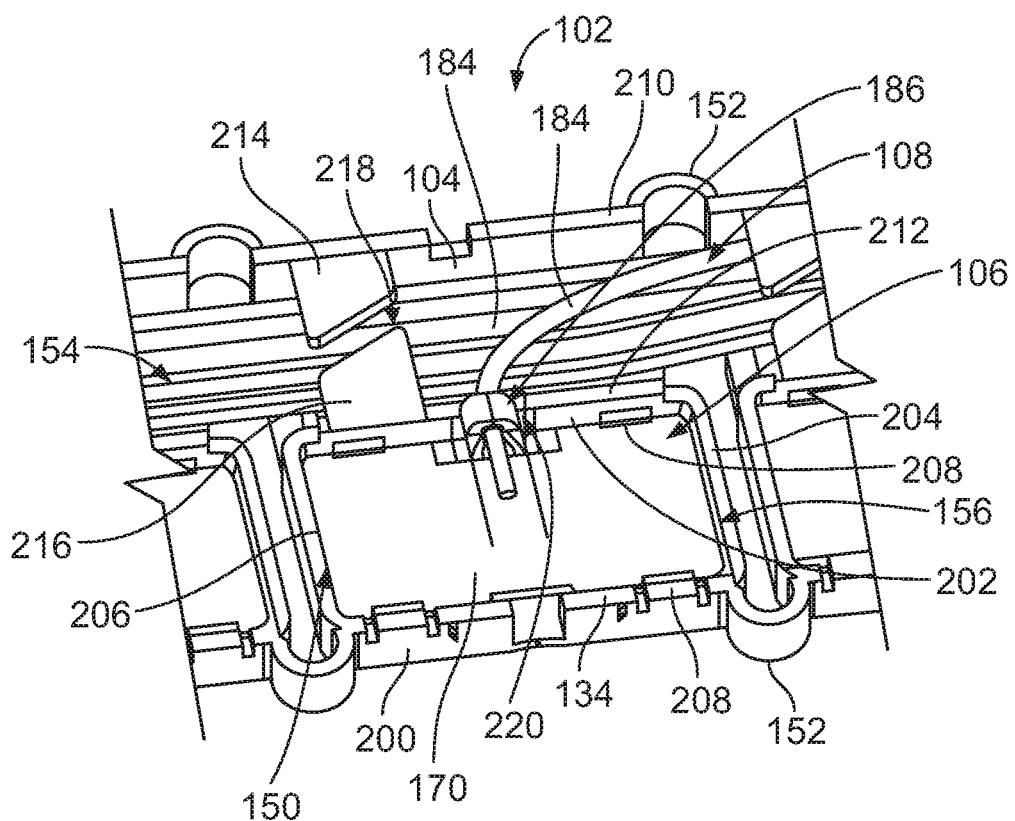
FIG. 6A is a bottom perspective view of a portion of the carrier assembly showing the bus bar assembly installed in the carrier housing.
Figure 6B:
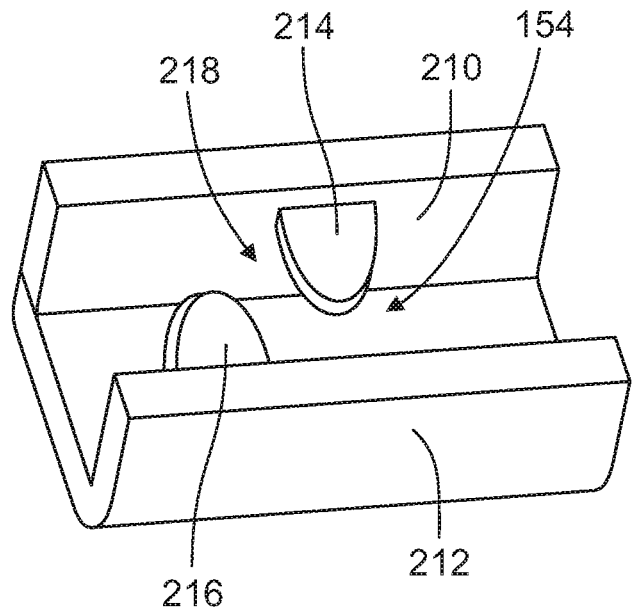
FIG. 6B is a bottom perspective view of a portion of the carrier assembly.

FIG. 6A shows a bottom perspective view of a portion of the carrier assembly 102 showing the bus bar assembly 106 installed in the cell connecting section 150 of the carrier housing 104. FIG. 6B is a bottom perspective view of a portion of the carrier assembly 102. The cell connecting section 150 includes a plastic tray defining the bus bar cavity portion 156 and the wire trace cavity portion 154.

The bus bar cavity portion 156 is defined between an outer wall 200, an inner wall 202 and opposite side walls 204, 206. The bus bar cavity portion 156 is sized and shaped to accommodate the bus bar 170. The bus bar assembly 106 is held within the bus bar cavity portion 156 by a plurality of latches 208. The latches 208 extend into the bus bar cavity portion 156 from the bottom surface of the outer wall 200 and inner wall 202. The latches 208 flex slightly as the bus bar 170 is inserted into the bus bar cavity portion 156 and snap back into an unflexed position to retain the bus bar 170 within the bus bar cavity portion 156.

The wire trace cavity portion 154 is defined by an outer wall 210 and an inner wall 212. The outer wall 210 and inner wall 212 extend from the bottom 134. Optionally, the inner wall 202 and the inner wall 212 may be combined in one wall. Guide plates 214, 216 (FIG. 6A) extend from the outer wall 210 and/or the inner wall 212 across the wire trace cavity portion 154. In the illustrated embodiment, the guide plates 214, 216 extend from the outer and inner wall 210, 212 towards each other adjacent to one end of the cell connecting section 150. The guide plates 214, 216 help retain the sensing wires 184 in the wire trace cavity portion 154. For example, sensing wires from multiple sensing wire assemblies 108 may pass through the wire trace cavity portion 154. The guide plates 214, 216 extend toward each other but do not meet, thus creating a slot or opening 218 between the guide plates 214, 216. The guide plates 214, 216 are shaped so that the slot 218 is slanted and is not parallel with the longitudinal axis 130. In an alternative embodiment (FIG. 6B), the guide plates 214, 216 extend from the opposite walls 210, 212 across the wire trace cavity portion 154, but are axially off-set from each other thus creating the slot or opening 218 therebetween. The guide plates 214, 216 may be rounded to allow easy insertion of the wires into the slot 218. The guide plates 214, 216 are shaped so that the slot 218 is slanted and is not parallel with the longitudinal axis 130. The slot 218 provides a space for inserting the sensing wires 184 into the wire trace cavity portion 154. The sensing wires 184 extend parallel to the longitudinal axis 130 within the wire trace cavity portion 154 and thus are blocked by one or both of the guide plates 214, 216 to ensure that the sensing wires 184 are not easily removed from the wire trace cavity portion 154.

The inner walls 202, 212 include openings 220 generally centrally located between the side walls 204, 206. Portions of the bus bar assembly 106 may extend through the openings 220, such as at least partially into the wire trace cavity portion 154. For example, the sensing wire grip 186 may be at least partially received in the openings 220 and the wire trace cavity portion 154. The sensing wire grip 186 may be held within the openings 220. Portions of the sensing wire assembly 108 may extend through the openings 220, such as at least partially into the bus bar cavity portion 156. For example, the sensing wire 184 may extend at least partially into the bus bar cavity portion 156.

Each cell connecting section 150 is connected to the adjacent cell connecting section 150 by one or more hinges 152. In the exemplary embodiment, a hinge 152 is located at each end of the outer walls 200, 210. The hinges 152 are living or flexible hinges which allow each cell connecting section 150 to move in relation to the adjacent cell connecting section 150. This allows for variations in the cell placements within the battery module 110.

Figure 7:
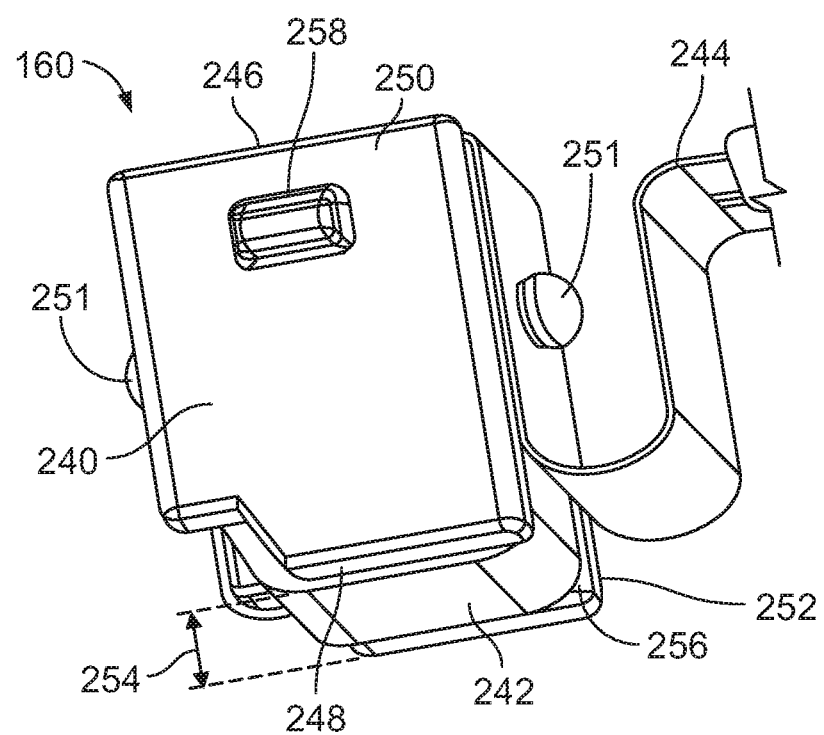
FIG. 7 is a perspective view of a thermistor assembly of the carrier assembly.

FIG. 7 is a perspective view of the thermistor assembly 160 in accordance with an exemplary embodiment. The thermistor assembly 160 includes a holder 240, a thermistor film 242 and a connecting terminal 244. The thermistor assembly 160 may be mounted within the carrier housing 104 (shown in FIG. 1), such as in a wire trace cavity portion 154. In an exemplary embodiment, the holder 240 is generally rectangular have a top 246, a bottom 248, and two opposite sides 250, 252. The sides 250, 252 define a thickness 254 of the holder 240. A holder external surface 256 extends circumferentially around the holder 240, such as along the top 246, the bottom 248 and the sides 250, 252.

The thermistor film 242 is installed on the external surface 256 of the holder 240 such that a portion of the thermistor film 242 extends along and is exposed at the bottom 248 of the holder 240. The thermistor film 242 has holes (not shown) that are snapped into and retained on posts 251, which may retain the thermistor film. The posts 251 may be mushroom shaped. A protrusion 258 extends outward from each side 250, 252. As will be described below, the protrusions 258 provide a stop for the movement of the holder 240 when installed within the carrier housing 104.

Figure 8:
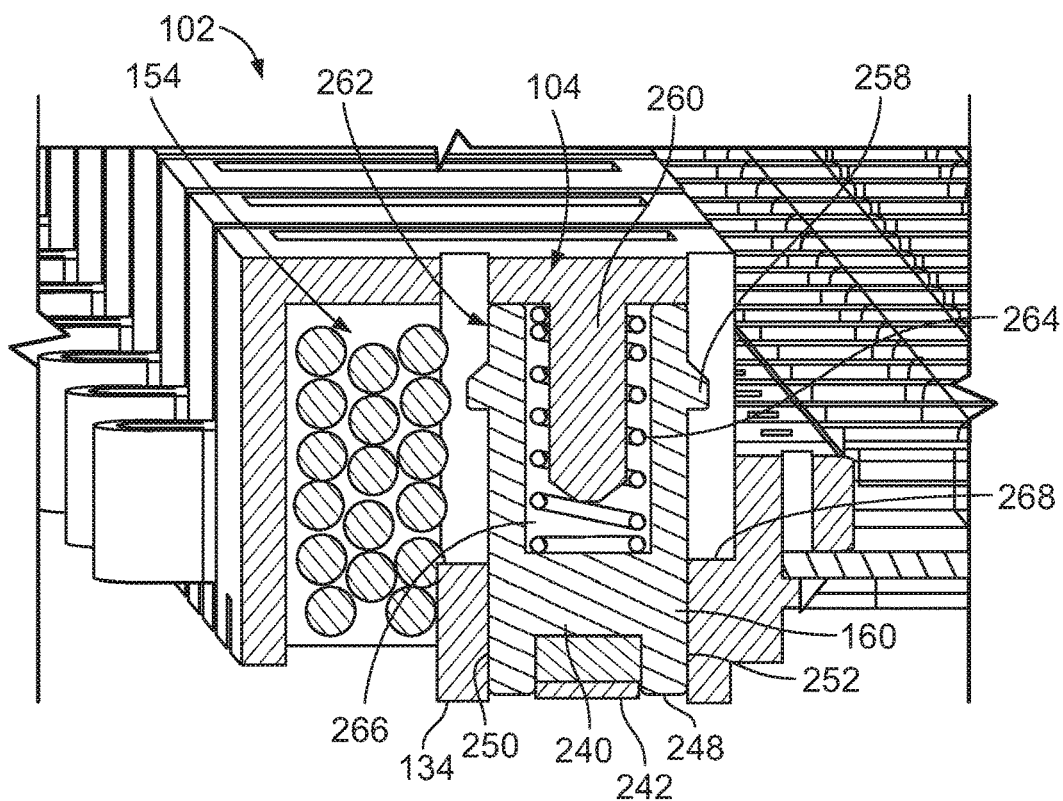
FIG. 8 is a cross-sectional view of the thermistor assembly.
Figure 9:
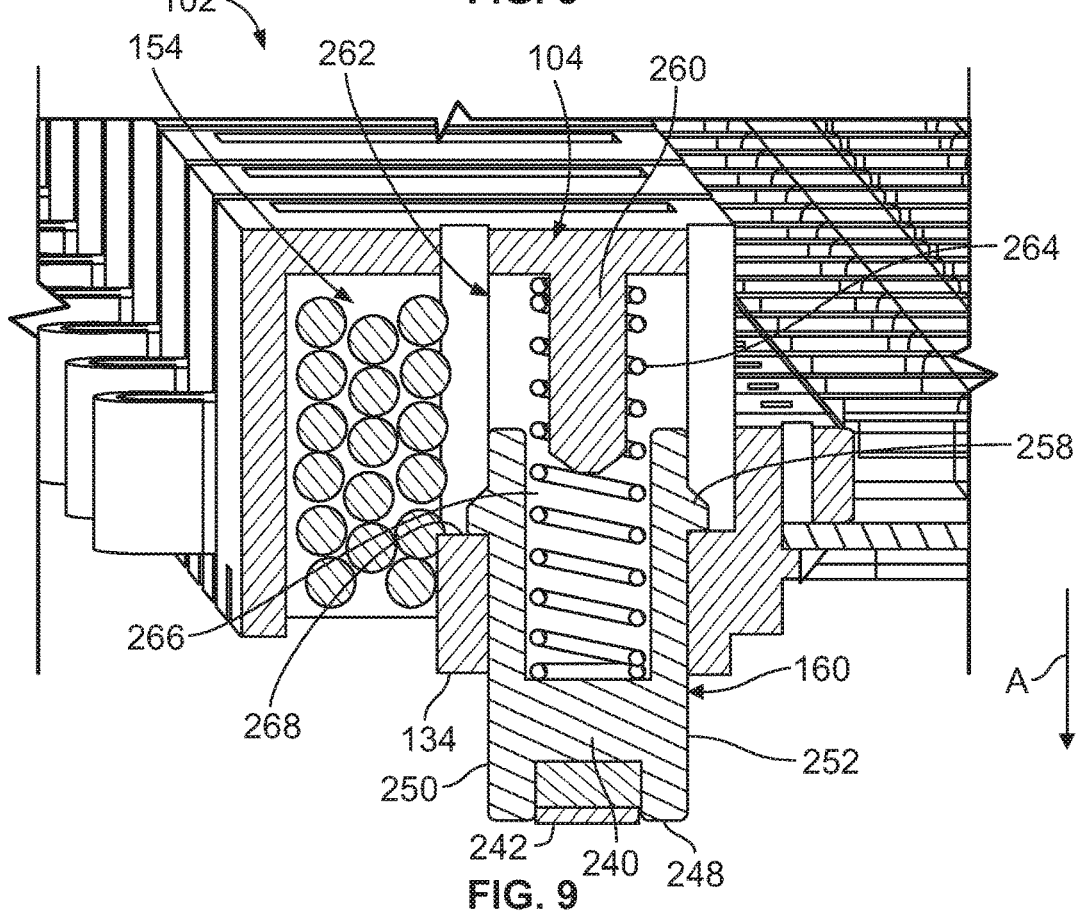
FIG. 9 is a cross-sectional view of the thermistor assembly.

FIGS. 8 and 9 show cross sectional views of the thermistor assembly 160 installed in the carrier housing 104. As shown in FIGS. 8 and 9, the carrier housing 104 includes an optional top post 260 extending into a thermistor assembly pocket 262, which may be part of the wire trace cavity portion 154. A spring 264 is positioned between the carrier housing 104 and the holder 240. For example, the spring 264 may be a coil spring that extends around the top post 260. The holder 240 includes a spring cavity 266 between the sides 250, 252. The spring cavity 266 receives the top post 260 and the spring 264.

When the carrier assembly 102 is installed on the battery module 110, the thermistor film 242 should be in close proximity or in contact with the battery cell for efficient operation. Tolerances between the battery cells 112 of the battery module 110 (both shown in FIG. 2) may cause a gap between the bottom 134 of the carrier housing 104 and the battery cell 112. In order to account for these tolerances and have the thermistor film 242 in close proximity to the battery cell 112, the bottom 248 of the holder 240 travels a variable distance by spring force from the bottom 134 of the carrier housing 104 towards the battery cell 112. FIG. 8 shows the thermistor assembly 160 in a retracted state where the holder 240 is pressed upward into the thermistor assembly pocket 262 and the spring 264 is compressed. The thermistor film 242 may be aligned with the bottom 134 of the carrier housing 104 in the retracted state. FIG. 9 shows the thermistor assembly 160 in an extended state where the holder 240 is partially extend outward from the carrier housing 104 and the spring is extended. If a gap exists between the bottom 134 of the carrier housing 104 and the battery cell 112, the thermistor holder 240 travels axially under spring force in a direction A towards the battery cell 112. The holder 240 may have a maximum travel distance defined by the protrusions 258 abutting against the carrier housing 104 at stop surfaces 268.

Figure 10:
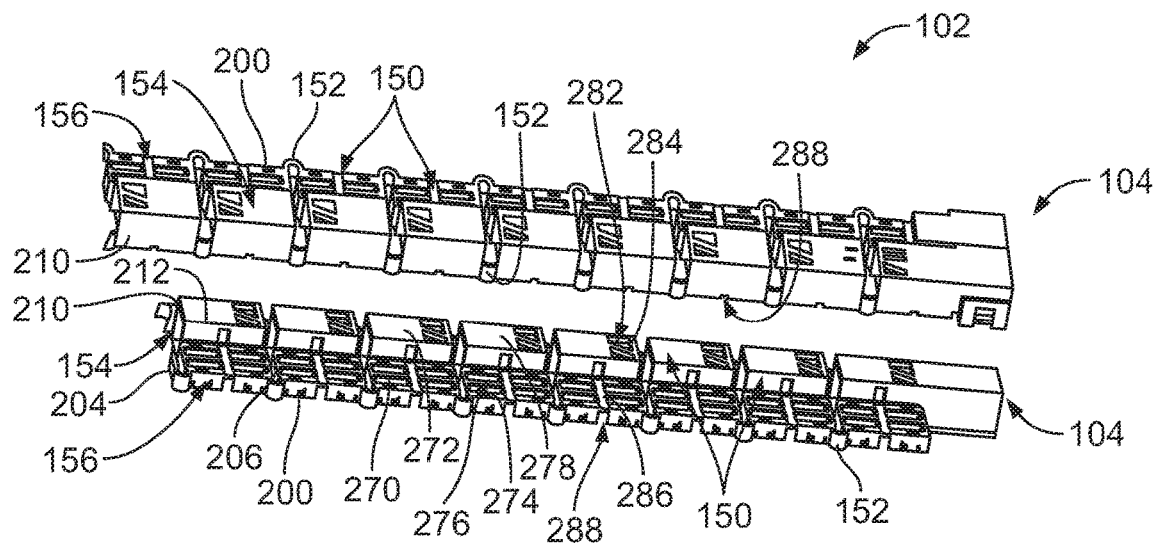
FIG. 10 is a top perspective view of the carrier assembly in accordance with an exemplary embedment.
Figure 11:
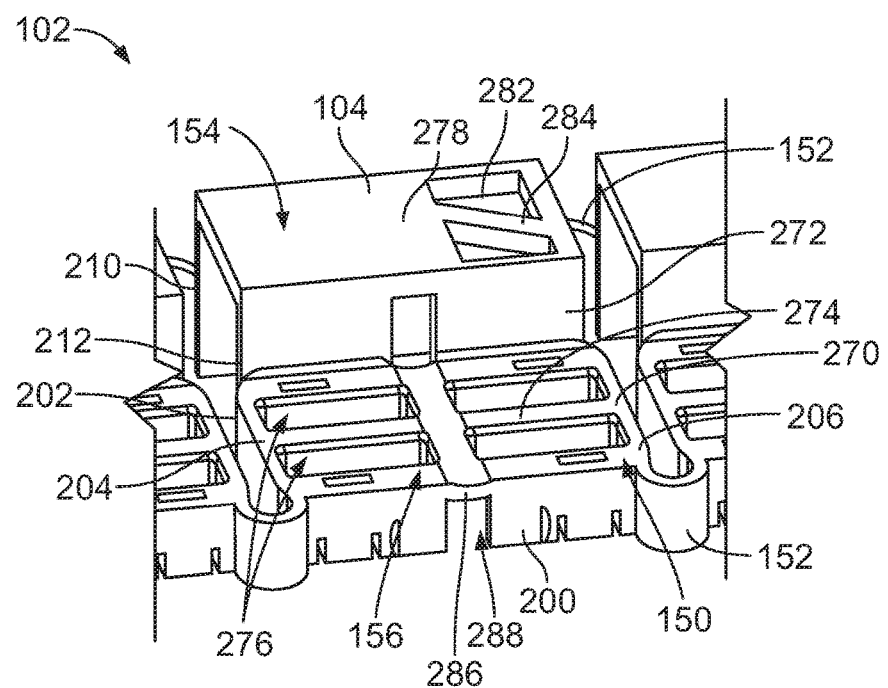
FIG. 11 is a top perspective view of a portion of the carrier assembly.

FIG. 10 shows a top perspective view of the carrier assembly 102 including the carrier housings 104. FIG. 11 is a top perspective view of a portion of one of the carrier housings 104. Each cell connecting section 150 is attached to the adjacent cell connecting sections 150 by the hinges 152. As shown in FIGS. 10 and 11, each cell connecting section 150 of the carrier housing 104 defines a cover for the bus bars 170 (shown in FIG. 4) and the sensing wires 184 (shown in FIG. 4). For example, the bus bar cavity portion 156 defines a bus bar cover portion 270 and the wire trace cavity portion 154 defines a wire trace cover portion 272. Optionally, the cover portions 270, 272 are part of the integral unitary structure of the carrier housing 104. Alternatively, the cover portions 270, 272 may be separate, discrete pieces that are coupled to the carrier housing 104 after the bus bars 170 and sensing wires 184 are received in the carrier housing 104.

As better shown in FIG. 11, the bus bar cover portion 270 includes a top wall 274 extending from the outer wall 200 to the inner wall 202 between the side walls 204, 206. A plurality of openings 276 extend through the top wall 274. The openings 276 provide access to the bus bar 170 held within the bus bar cavity portion 156, such as for welding to the corresponding cell terminals 120, 122 (shown in FIG. 2).

The wire trace cover portion 272 includes a top wall 278 extending from inner wall 212 to outer wall 210. In an exemplary embodiment, the inner wall 212 and outer wall 210 extend above the top wall 274 of the bus bar cover portion 270 so that the top wall 278 is raised above the top wall 274. The wire trace cover portion 272 is formed to provide access for the thermistor assembly 160 (shown in FIGS. 8, 9 and 12) within the wire trace cavity portion 154. The top wall 278 of the wire trace cover portion 272 includes a window 282. The window 282 includes a cross bar 284 extending across the window 282 at an angle. The window 282 and cross bar 284 correspond and align with the guide plates 214, 216 and slot 218 (shown in FIGS. 6A and/or 6B).

In an exemplary embodiment, the bus bar cover portion 270 includes one or more flexible cover hinges 286 and the outer walls 200, 210 of the bus bar cavity portion 156 and the wire trace cavity portion 154 of each cell connecting section 150 include spaces 288 that allow some flexing of the middle section of the cell connection section 150. The cover hinges 286 and spaces 288 may be located at the approximate longitudinal middle of the cell connecting sections 150. The flexible cover hinges 286 and spaces 288 are located generally in the center of the outer walls 200, 210 and allow each cell connecting section 150 further flexibility. The flexible cover hinges 286 provides the ability of the carrier housing 104 to flex to accommodate tolerances in the battery cells 112 or in the installation of the carrier assembly 102 to the battery module 110.

The carrier housings 104 are single piece structures that hold the bus bars 170, sensing wires 184 and thermistor assemblies 160, which may all be pre-loaded into the carrier housings 104 and installed to the battery module 110 as a unit. The single piece carrier housing 104 provides a simpler, more cost effective battery connector system. The bus bars 170 are held in place by the carrier housing 104 over the battery cells 112 for termination of the bus bars 170 to the cell terminals 120, 122. Welding of the bus bars to the cell terminals 120, 122 may be accomplished through the openings in the carrier housing 104.

Figure 12:
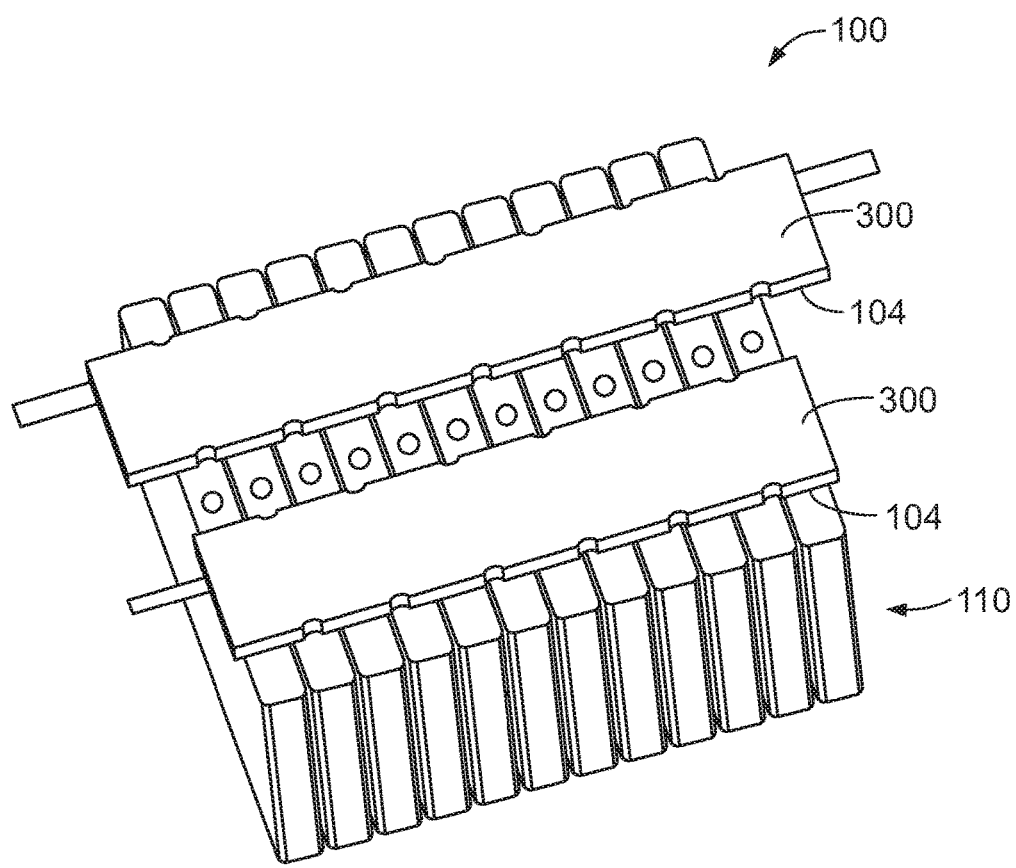
FIG. 12 is a top perspective view of the battery connector system with a cover portion in accordance with an exemplary embodiment.
Figure 13:
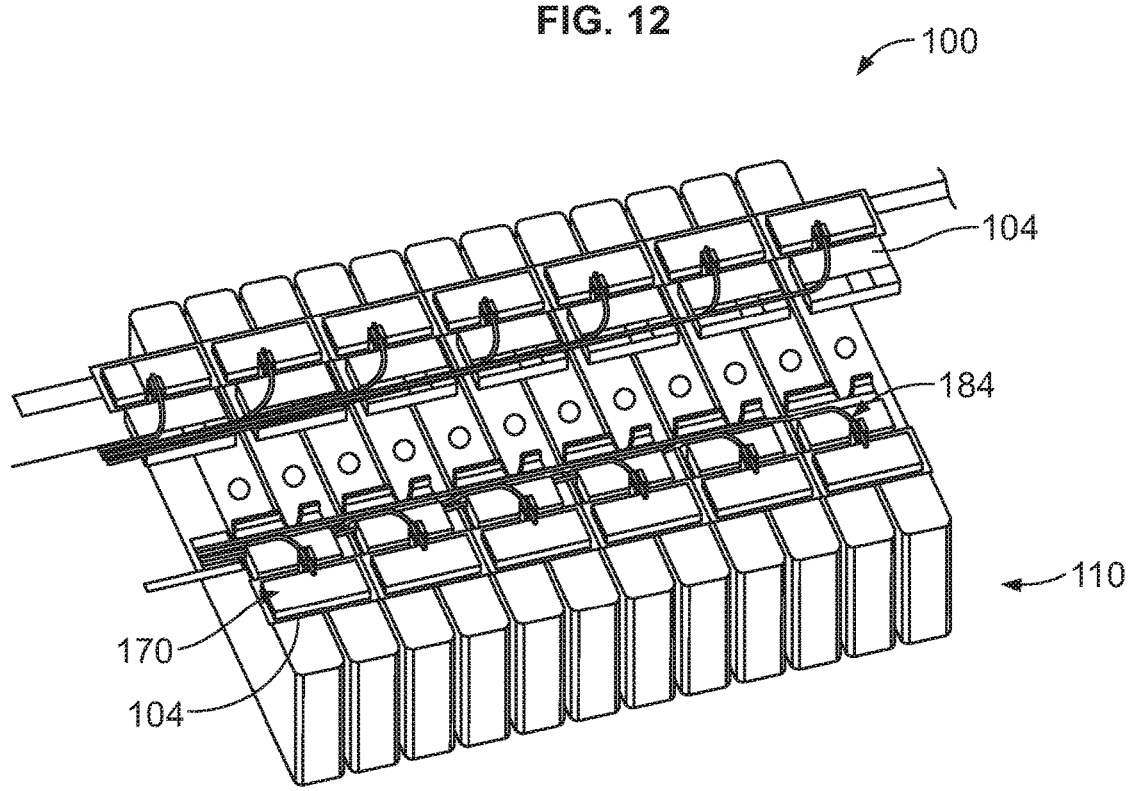
FIG. 13 is a top perspective view of the battery connector system with a cover portion in accordance with an exemplary embodiment.

FIGS. 12 and 13 are top perspective views of the battery connector system 100 with a separate cover portion 300 (shown in FIG. 12) mounted to the carrier housings 104 (shown in FIG. 13). The carrier housings 104 are open at the top rather than being closed, as with the embodiment, shown in FIG. 1. The carrier housings 104 may receive the bus bars 170 and sensing wires 184 through the open top. The cover portion 300 is coupled to the carrier housing 104 after the carrier housing 104 is positioned on the batter module 110. For example, the cover portion 300 may be secured by tabs, latches, clips, fasteners, and the like.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A battery connector system for connecting battery cells of a battery module comprising:
    a carrier assembly comprising:
        bus bar assemblies each having a bus bar including a first weld interface and a second weld interface configured to connect corresponding battery cell terminals of adjacent battery cells by welding the first and second weld interfaces to the corresponding battery cell terminals, and
        a carrier housing having cell connecting sections holding the bus bar assemblies, the cell connecting sections being open at the bottom to receive the bus bar assemblies through the bottom to mount the bus bar assemblies to the battery cell terminals through the bottom of the carrier housing, and the cell connecting sections having openings in the top of the carrier housing providing access to the bus bar assemblies for welding the first and second weld interfaces to the corresponding battery cell terminals through the openings, the carrier housing having cover portions associated with and covering the cell connecting sections, wherein the carrier housing has a unitary construction with the cell connecting sections and the cover portions being integral.

2. The battery connector system of claim 1, wherein each of the bus bar assemblies includes a sensing wire assembly attached directly to the bus bar.

3. The battery connector system of claim 1, wherein the openings are open above the bus bars, the bus bars being positioned between the cell connecting section and the corresponding battery cell terminals of the battery cells.

4. The battery connector system of claim 1, wherein the bus bar assemblies are configured to be installed within the carrier housing prior to the carrier housing being attached to the battery cells such that the bus bar assemblies are attached to the battery cells as the carrier housing is attached to the battery cells.

5. The battery connector system of claim 1, wherein each of the cell connecting sections is connected to an adjacent one of the cell connecting sections by one or more flexible hinges allowing relative movement between the cell connecting sections.

6. The battery connector system of claim 1, wherein the cover portions of the cell connecting sections include flexible cover hinges therebetween to provide flexibility between the cover portions.

7. The battery connector system of claim 1, further comprising a thermistor assembly held within the carrier housing in thermal contact with at least one of the battery cells.

8. The battery connector system of claim 7, wherein the thermistor assembly includes a holder having a spring cavity with a spring installed in the spring cavity of the holder, the thermistor assembly including a thermistor film attached to the holder, wherein the holder is configured to travel axially a distance under spring force to move the holder and thermistor film towards the battery cell.

9. The battery connector system of claim 1, wherein each of the cell connecting sections includes a bus bar cavity portion receiving one of the bus bar assemblies and a wire trace cavity portion receiving a corresponding sensing wire assembly, and wherein each of the cover portions comprise a bus bar cover portion covering the bus bar cavity portion and the corresponding bus bar assembly and a wire trace cover portion covering the wire trace cavity portion and the corresponding sensing wire assembly.

10. The battery connector system of claim 9, wherein each bus bar cavity portion includes an outer wall and each wire trace cavity portion includes an outer wall on an opposite side of the carrier housing than the outer wall of the bus bar cavity portion, first flexible hinges extending between the outer walls of the bus bar cavity portions and second flexible hinges extending between the outer walls of the wire trace cavity portions.

11. The battery connector system of claim 9, wherein the wire trace cavity portion includes guide plates extending between an outer wall and an inner wall of the wire trace cavity portion toward each other across the wire trace cavity portion so that a slot is formed between the guide plates, and wherein the guide plates are shaped so that the slot extends at an angle not parallel to a carrier housing longitudinal axis.

12. A battery connector system for connecting battery cells of a battery module comprising:
    a carrier assembly comprising:
        bus bar assemblies each having a bus bar including a first weld interface and a second weld interface configured to connect corresponding battery cell terminals of adjacent battery cells by welding the first and second weld interfaces to the corresponding battery cell terminals,
        a carrier housing having cell connecting sections holding the bus bar assemblies, the cell connecting sections being open at the bottom to receive the bus bar assemblies through the bottom to mount the bus bar assemblies to the battery cell terminals through the bottom of the carrier housing, and the cell connecting sections having openings in the top of the carrier housing providing access to the bus bar assemblies for welding the first and second weld interfaces to the corresponding battery cell terminals through the openings, the cell connecting sections being connected by flexible hinges, the flexible hinges allowing relative movement between the cell connecting sections, wherein the carrier housing has a unitary construction with the cell connecting sections and the flexible hinges being integral; and
        cover portions associated with and covering the cell connecting sections.

13. The battery connector system of claim 12, wherein each of the bus bar assemblies includes a sensing wire assembly attached directly to the bus bar.

14. The battery connector system of claim 12, wherein each of the cell connecting sections includes a bus bar cavity portion receiving the corresponding bus bar assemblies and a wire trace cavity portion receiving a corresponding sensing wire assembly.

15. The battery connector system of claim 14, wherein each bus bar cavity portion includes an outer wall and each wire trace cavity portion includes an outer wall on an opposite side of the carrier housing than the outer wall of the bus bar cavity portion, the flexible hinges extending between the outer walls of the bus bar cavity portions and the flexible hinges extending between the outer walls of the wire trace cavity portions.

16. The battery connector system of claim 14, wherein the wire trace cavity portion includes guide plates extending between an outer wall and an inner wall of the wire trace cavity portion toward each other across the wire trace cavity portion so that a slot is formed between the guide plates, and wherein the guide plates are shaped so that the slot extends at an angle not parallel to a carrier housing longitudinal axis.

17. A battery connector system for connecting battery cells of a battery module comprising:
bus bar assemblies, each of the bus bar assemblies having a bus bar including a first weld interface and a second weld interface configured to connect battery cell terminals of the corresponding battery cells by welding the first and second weld interfaces to the corresponding battery cell terminals;
sensing wire assemblies connected to the corresponding bus bar assemblies, each of the sensing wire assemblies having a sensing wire mechanically and electrically connected to the corresponding bus bar; and
a carrier assembly having a carrier housing, the carrier housing comprising cell connecting sections, each of the cell connecting sections comprising a bus bar cavity portion holding the corresponding bus bar therein, the bus bar cavity portion being open at the bottom to receive the bus bar assemblies through the bottom to mount the bus bar to the battery cell terminal through the bottom of the carrier housing, the cell connecting sections having openings in the top of the carrier housing providing access to the bus bar assemblies for welding the first and second weld interfaces to the corresponding battery cell terminals through the openings, and the carrier housing having a wire trace cavity portion holding a plurality of the wires of the sensing wire assemblies, wherein the carrier housing has a unitary construction with each of the cell connecting sections being integral and the carrier assembly having cover portions associated with and covering the cell connecting sections.

18. The battery connector system of claim 17, wherein the openings are open above the bus bars.

19. The battery connector system of claim 17, wherein each of the cell connecting sections is connected to another of the cell connecting section by one or more flexible hinges allowing relative movement between the cell connecting sections, the flexible hinges being part of the unitary construction and integral with the cell connecting sections.

20. The battery connector system of claim 17, wherein the wire trace cavity portion includes guide plates extending between an outer wall and an inner wall of the wire trace cavity portion toward each other across the wire trace cavity portion so that a slot is formed between the guide plates, and wherein the guide plates are shaped so that the slot extends at an angle not parallel to a carrier housing longitudinal axis.

* * * * *